2,750,362

PEROXIDES OF LONG-CHAIN OLEFINIC COMPOUNDS

Daniel Swern and Joseph E. Coleman, Philadelphia, and Hogan B. Knight, Spring House, Pa., assignors to the United States of America as represented by the Secretary of Agriculture No Drawing. Application December 5, 1952, Serial No. 324,426

15 Claims. (Cl. 260—96.5)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the United States of America.

This invention relates to peroxides of long-chain olefinic compounds and to methods for their production and isolation.

An object of this invention is to provide an improved process for the production of peroxides of long-chain olefinic compounds and for the concentration, purification and isolation of such peroxides. Another object is to provide a method for the directed autoxidation of unsaturated fats, fatty acids, esters of fatty acids, and other long-chain olefinic compounds related to or derived from fats, whereby peroxides are formed in high concentrations. Another object is to provide a means of sequestering or deactivating trace amounts of catalytically active metals or metallic ions in fats and fatty materials.

By "unsaturated fatty materials" we mean to include all fats, fatty acids, esters of fatty acids, fatty alcohols obtained by hydrogenation of fats, esters of fatty alcohols, etc., which contain one or more double bonds in the carbon chain. By "autoxidation" we mean any oxidation using gaseous oxygen or an oxygen-containing gas.

The autoxidation of unsaturated fats and fatty materials produces peroxides as the principal first product. However, as the reaction proceeds and the concentration of peroxides increases, further reactions in which the peroxides are consumed begin, with the result that the concentration of peroxides tends to approach a limiting value at which the rate of formation is equal to the rate of decomposition. This approach to an equilibrium value prevents the direct formation of peroxides by conventional processes in concentrations above about 25 to 30% and causes considerable loss of material by decomposition even at the level of 25 to 30%. Only in rare instances can peroxide levels of as much as 35% be obtained by autoxidation alone.

In our co-pending application, Serial Number 290,112, filed May 26, 1952, now abandoned, Concentrating Peroxides of Autoxidized Long-Chain Fatty Acids and Esters—Knight, Coleman and Swern, we describe a new process for concentrating the peroxides formed by autoxidation of fats and fatty materials comprising removal of the non-oxidized material by precipitation as a crystalline urea complex. By this method the concentration of the peroxides can be raised from 25–30% to about 70–90%. When using this urea method, or any other method, for the concentration of peroxides it is desirable to start with as high a concentration of peroxides as possible. However, as explained above, the practical limit heretofore has been about 25–30%.

We have now discovered that peroxide concentrations as high as 35 to 45% may be produced directly in the autoxidation of fats and fatty materials if small amounts of metal deactivators are present. Since all commercially processed fats and fatty materials have at some time been in contact with iron- or copper-containing metal equipment, and since many metallic ions, particularly those of iron and copper, are known to catalyze the decomposition of peroxides, it is believed that the function of the metal deactivators in our process is to deactivate or sequester the pro-oxidant metallic ions incidentally present as contaminants in the material being autoxidized.

It is surprising that metal deactivators are useful in directionalizing the oxidation to the production of high concentrations of peroxides in our process because it is conventional in the oil and fat industry to add such deactivators to oils and fats to aid in preventing or retarding development of rancidity (autoxidation). As a matter of fact we have observed that autoxidation is inhibited at first, and initial oxidation is somewhat slower when we use a deactivator than when none is used. This small disadvantage is many times compensated for, however, by the much higher concentration of peroxide finally achieved and by the greatly reduced decomposition of the product to form undesirable byproducts. These latter advantages are especially important if the peroxides formed in the autoxidation are to be concentrated or purified for further use. This is particularly true if this concentration is done by our improved process described in our co-pending application mentioned above, but is also true regardless of the separation method used.

Metal deactivators are a well known class of compounds having the common property that they can combine with a variety of common polyvalent metallic ions to form complexes in which the metal is chemically and catalytically inactive. Common examples are phosphoric acid, ascorbic acid, ascorbyl palmitate, citric acid, tartaric acid, phytic acid and 8-hydroxyquinoline.

The amount of deactivator required in our process will vary somewhat with the metallic content of the material being treated but is in all cases small; ordinarily, we have found, 0.01 to 0.05% is sufficient, though somewhat more may be needed if the metallic contamination of the material being treated is high.

Our invention is illustrated by the following examples:

Example I

To 20 g. of methyl oleate was added 0.0065 g. (0.032%) of phosphoric acid. It was then autoxidized at 80° C. under ultraviolet irradiation for 72 hr. During this time the peroxide content was followed by analysis and was found to have reached a maximum of 44.2%. In a similar experiment in which the phosphoric acid was omitted, the maximum peroxide content reached was 30%.

Example II

One hundred grams of methyl oleate containing 0.025% of ascorbic acid was autoxidized at 80° C. in the dark for 70 hr., at which time the peroxide content was 37%. (In a similar experiment in which the ascorbic acid was omitted, the peroxide content was only 25%.) Ninety grams of the autoxidized methyl oleate was added to a boiling solution of 378 g. of urea in 630 ml. of methanol. The heat was removed and the solution was stirred until it cooled to room temperature. Filtration removed a crystalline precipitate of urea complexes containing most of the non-peroxidic materials present in the autoxidation mixture. Evaporation of methanol from the filtrate, followed by addition of water to dissolve the excess urea yielded 40 g. of peroxide concentrate containing 70% peroxide.

Examples III–VI

Results substantially identical with those of Example I were obtained by replacing the phosphoric acid with 0.01 to 0.025% of ascorbic acid, phytic acid, citric acid or 8-hydroxyquinoline.

Example VII

Results substantially identical with those of Example II were obtained by replacing the ascorbic acid of Example II with phosphoric acid.

Example VIII

This example illustrates the failure to achieve a significant concentration of peroxides from methyl oleate oxidized to a relatively high peroxide level in the absence of a metal deactivator. Methyl oleate was autoxidized in the dark at 80° for 89½ hrs. Its peroxide content was 32%. When the peroxide concentration technique of Example II was employed, a poor yield of a 43% peroxide concentrate was obtained from the filtrate.

While the examples shown use methyl oleate, our process is equally valuable in the autoxidation of oleic acid, other oleic esters, elaidic acid and its esters, and in general, unsaturated fats, fatty acids, esters of fatty acids, and other fatty materials.

While the examples show autoxidation at 80° C., our process is operable from room temperature to about 120° C. At the lower temperatures the rate of oxidation is inconveniently low while at the higher temperatures there is considerable loss of product through decomposition or polymerization of the peroxide initially formed. Ultraviolet light is useful for accelerating the autoxidation, especially at the lower temperatures, and appears to have no harmful influence.

Although the peroxide concentration procedures given in the examples describe the use of the urea to effect such concentration, other methods for concentrating peroxides are also satisfactory. These include solvent crystallization, high-vacuum distillation and solvent extraction procedures, such as countercurrent and liquid-liquid extraction.

We claim:

1. A process comprising autoxidizing an unsaturated fatty material containing a pro-oxidant metal contaminant in the presence of a metal deactivator until a peroxide content exceeding about 30% is produced, and isolating the thus-produced peroxides.

2. The process of claim 1 wherein the fatty material is a derivative of oleic acid.

3. The process of claim 1 wherein the fatty material is an ester of oleic acid.

4. The process of claim 1 wherein the fatty material is methyl oleate.

5. The process of claim 1 wherein the deactivator is phosphoric acid.

6. The process of claim 1 wherein the deactivator is ascorbic acid.

7. The process of claim 1 wherein the deactivator is citric acid.

8. The process of claim 1 wherein the deactivator is 8-hydroxyquinoline.

9. The process of claim 1 wherein the deactivator is phytic acid.

10. The process of claim 1 wherein the fatty material is methyl oleate and the deactivator is phosphoric acid.

11. The process of claim 1 wherein the fatty material is methyl oleate and the deactivator is ascorbic acid.

12. The process of claim 1 wherein the fatty material is methyl oleate and the deactivator is 8-hydroxyquinoline.

13. The process of claim 1 wherein the fatty material is methyl oleate and the deactivator is citric acid.

14. The process of claim 1 wherein the fatty material is methyl oleate and the deactivator is phytic acid.

15. A process of producing a high concentration of a peroxide of an unsaturated fatty material containing a pro-oxidant metal contaminant which comprises autoxidizing the fatty material in the presence of a metal deactivator until a peroxide content of more than 30% is produced, then adding an excess of urea to the autoxidized mixture to precipitate most of the non-peroxidic material present, filtering the resulting mixture to remove the precipitate and to obtain a filtrate containing a high concentration of peroxide, and washing out the excess urea from the filtrate with water to isolate the peroxides in a concentration higher than 50%.

References Cited in the file of this patent

UNITED STATES PATENTS 2,610,973    Evans et al. _____ Sept. 16, 1952

OTHER REFERENCES

Abstract of Papers presented at the Fourth Meeting-in-Miniature (Philadelphia), January 18, 1951. Pages 65 and 66. American Chemical Society (February 6, 1951).

Bailey: Industrial Oil and Fat Products (2nd ed.), Interscience Publishers, Inc. (1951), pages 57–64.

Coleman et al.: "J. A. C. S.," vol. 74, pages 4886 to 4889 (1952).